Dec. 7, 1943.  B. M. HYMAN  2,335,942

MEANS FOR COUPLING IMPLEMENTS TO TRACTORS

Filed March 18, 1942  3 Sheets-Sheet 1

Inventor:
Benjamin M. Hyman
By Paul O. Pippel
Atty.

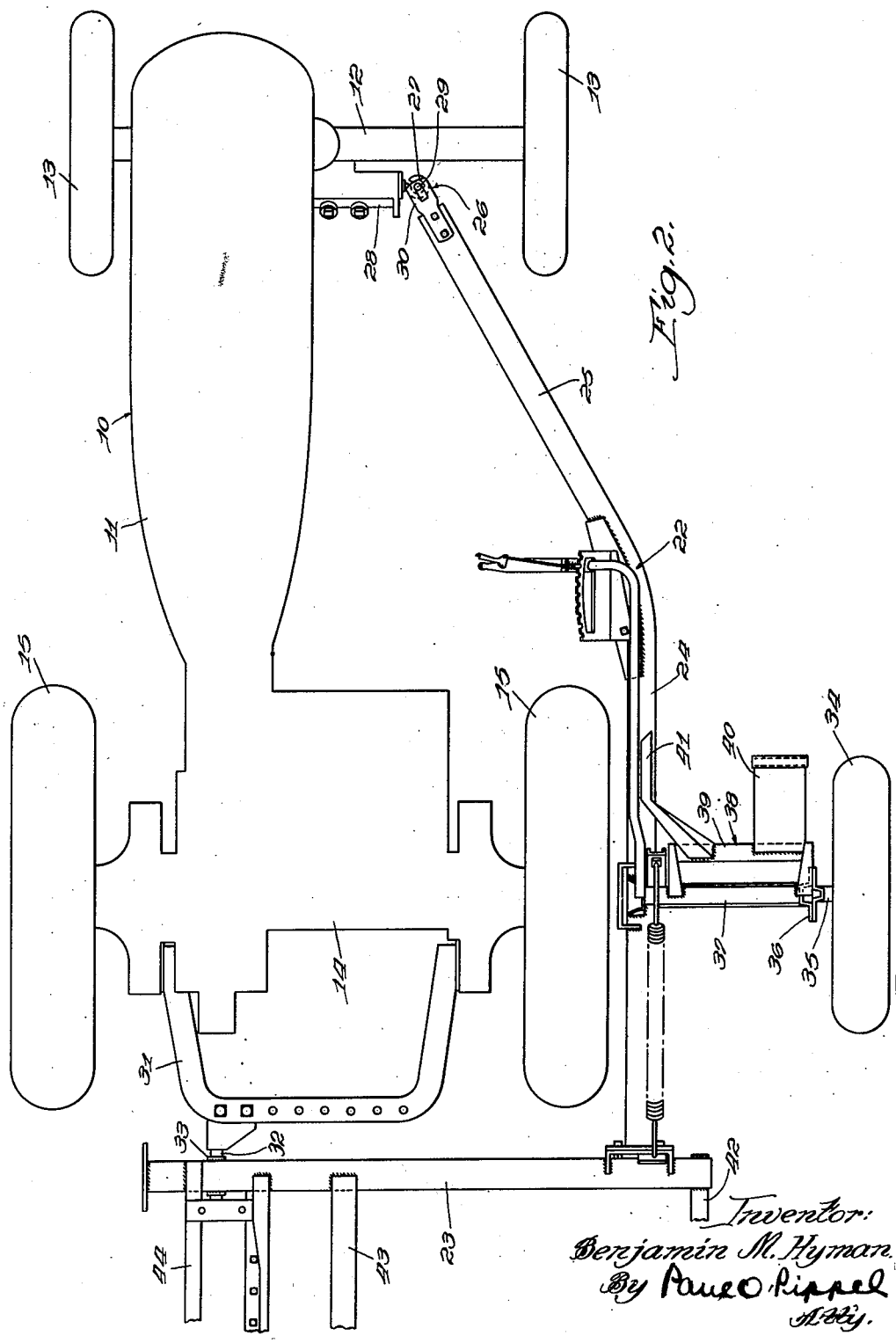

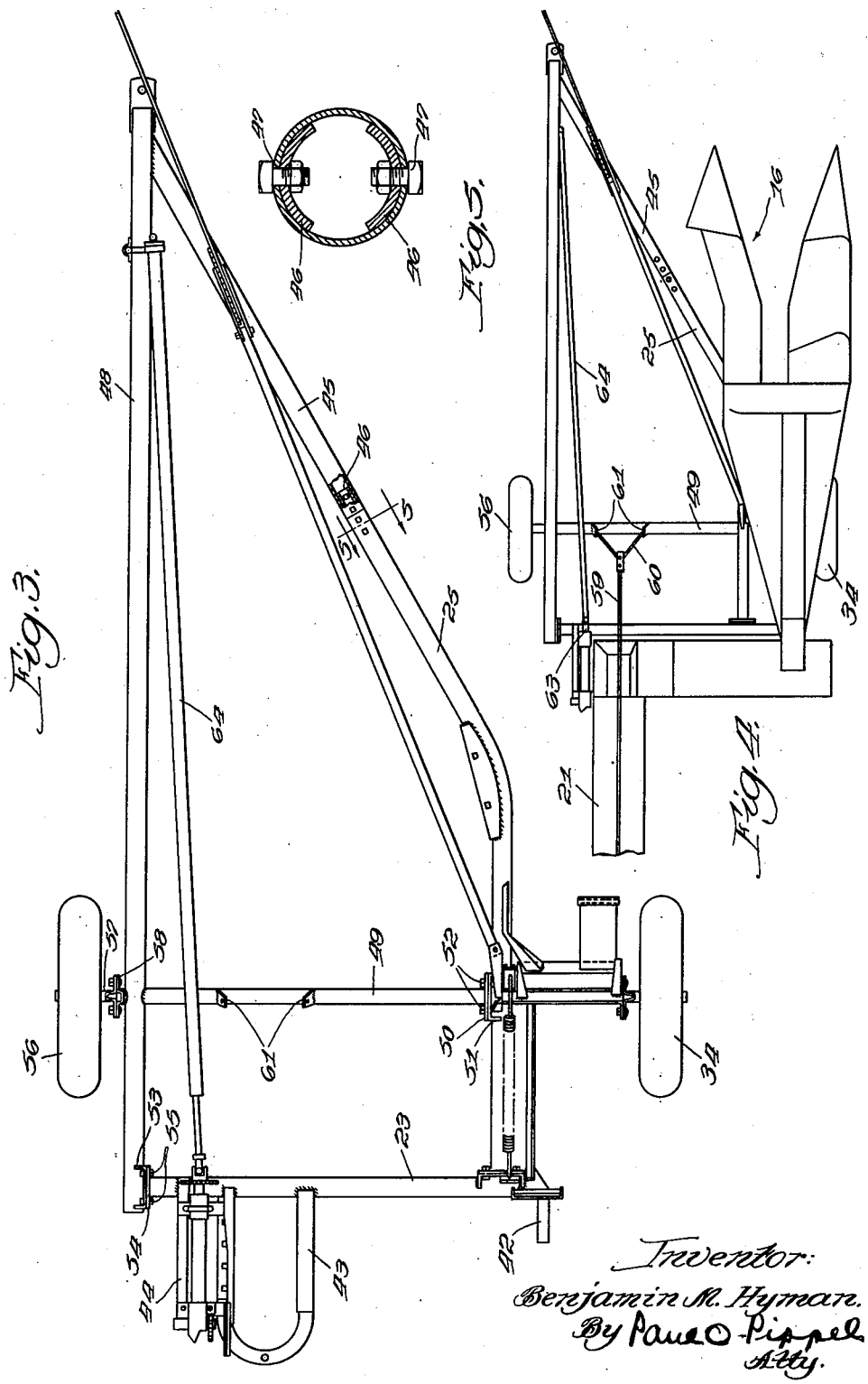

Patented Dec. 7, 1943

2,335,942

UNITED STATES PATENT OFFICE 2,335,942

MEANS FOR COUPLING IMPLEMENTS TO TRACTORS

Benjamin M. Hyman, Moline, Ill., assignor to International Harvester Company, a corporation of New Jersey Application March 18, 1942, Serial No. 435,121

9 Claims. (Cl. 56—15)

This implement relates to a structure for connecting an implement to a tractor. More specifically, it relates to a structure for coupling a corn picker to a tractor alternately in close-coupled relationship and in pull-behind relationship.

It is known to couple a harvester, such as a corn picker, at the side of a tractor on a framework which is supported in part on the tractor and in part on a special carrying wheel. At times it may be desirable to use the corn picker in regular trail-behind position, and, unless the farmer owns two corn pickers, he is faced with the problem of connecting a corn picker, which is normally carried in close-coupled relationship, in pull-behind relationship behind the tractor.

An object of the present invention is to provide an improved structure for connecting a harvester to a draft means.

A further object is the provision of an improved structure for coupling a corn picker to a tractor.

Another object is to provide a structure by which a harvester may be connected to a tractor either in close-coupled relationship alongside the tractor or in pull-behind relationship to the rear of the tractor.

According to the present invention, a corn picker is connected in close-coupled relationship at the side of a tractor by means of a generally L-shaped frame structure, and, for connecting the corn picker in trail-behind relationship to the tractor, a converting frame structure is used which is attached to the L-shaped frame.

In the drawings:

Figure 2 is a plan view showing the tractor and the frame-work, by which the corn picker shown in Figure 1 is attached to the tractor;

Figure 3 is a plan view showing a converted frame structure, by which a corn picker may be connected to a tractor in trail-behind relationship;

Figure 4 is a plan view showing the converted frame-work of Figure 3 and a corn picker mounted thereon, ready to be connected in trail-behind relationship to the tractor; and Figure 5 is a sectional view taken on the lines 5—5 of Figure 3.

Figure 1:
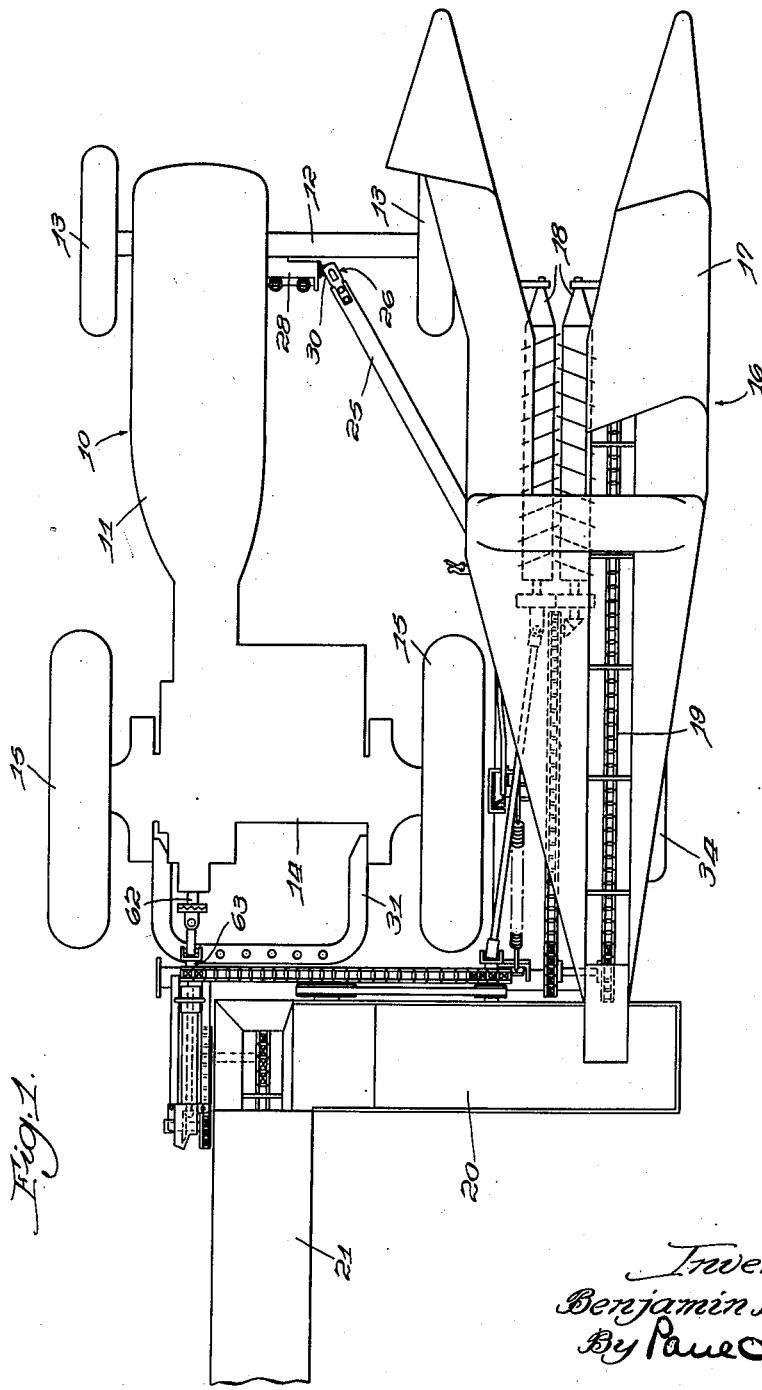
Figure 1 is a plan view showing a corn picker attached in close-coupled relationship at the side of a tractor.

In a copending application of Benjamin M. Hyman, Serial No. 392,924, filed May 10, 1941, there is shown and claimed the attaching of a corn picker at the side of a tractor in close-coupled relationship approximately as indicated in Figure 1 of the present application. As seen in this figure, the reference character 10 indicates a tractor having an offset body 11, a front axle 12, front wheels 13, rear axle structure 14, and rear wheels 15. The reference character 16 indicates a corn harvester which comprises a snapping unit 17 composed essentially of picker rolls 18, an ear elevator 19, and a structure 20 extending transversely across the rear of the tractor, which may be merely a chute if the corn harvester is a so-called corn snapper or may be a husking unit if the corn harvester is a so-called corn picker. The corn harvester also includes a rearwardly and upwardly extending wagon elevator 21. The corn harvester is supported by a frame 22 illustrated in Figure 2. This frame is generally of L shape and comprises a transverse leg 23 extending across the rear of the tractor and a longitudinal leg 24 attached at one end to the transverse leg 23 and having a bent end portion 25 extending at an obtuse angle to the remainder of the longitudinal leg 24 and pivotally connected, as at 26, to a point adjacent the front of the tractor 10. The connection 26 includes an eye member 27 secured to a structure 28 on the tractor and a bolt 29 extending through the eye 27 and members 30 bolted to the bent end 25 of the longitudinal frame leg 24 and embracing the eye 27 and supporting the bolt 29. The left end of the transverse frame leg 23, as viewed in Figure 2, is pivotally supported on a tractor draw-bar 31, by means of a pin 32 secured to the draw-bar, and a sleeve 33 rotatably supported on the pin 32 and secured to the transverse frame leg 23. The frame 22 is supported in part on the tractor by the connection 26 with the front end of the tractor and the connection of the transverse frame leg 23 with the draw-bar 31. The frame is also supported on a wheel 34 connected with the longitudinal frame leg 24 by a stub axle 35, a vertical structure 36, and a short transverse member 37.

The corn harvester 16 is carried on the frame 22 by means of a structure 38 secured to the short transverse member 37. This includes a member 39 parallel to the frame member 37 and brackets 40 and 41, which provide supports for the corn harvester. This is more fully shown in the aforementioned copending application of Benjamin M. Hyman and forms no part of the present invention. Attached to the transverse frame legs 23 and extending rearwardly therefrom is a member 42 at the right hand of the leg, a U-shaped structure 43 at the intermediate portion of the leg, and a member 44 adjacent the left end of the leg. These parts form a support for the structure 20 and the wagon elevator 21.

When the corn harvester 16 is to be connected to the tractor 10 in pull-behind relationship, as shown in Figure 4, the frame 22 is disconnected from the tractor. Parts 30 are disconnected from the bent end 25 of the longitudinal frame leg 24, and a joining member 45 is secured to the bent end 25 as an extension thereof. The joining member 45 is of tubular form, as is the bent end 25, and so the joining member 45 is secured to the bent end 25 by means of curved pieces 46, which fit within the joining member 45 and the bent end 25 and are bolted thereto, as indicated at 47 in Figure 5. The joining member 45 forms part of a converting frame-work which also includes a longitudinal member 48, to which the front end of the joining member 45 is secured and a transverse member 49 secured at one end to an intermediate point of the longitudinal member 48 and attached to the longitudinal frame leg 24 by means of a plate 50 secured to the transverse member 49, a U-shaped member 51 secured to the longitudinal frame leg 24, and bolts 52 connecting the parts 50 and 51. Similarly the rear end of the longitudinal member 48 is secured to the left end of the transverse frame leg 23 by means of a U-shaped member 53 secured to the end of the member 48, a plate 54 secured to the frame leg 23, and bolts 55 joining the parts 53 and 54. A supporting wheel 56, axially alined with the supporting wheel 34, is connected to the converting frame-work by a stub axle 57 and a depending structure 58 connecting the left end of the transverse member 49 and the stub axle 57. Figure 5 shows the corn harvester unit 16 mounted upon the new attaching structure formed by the converting frame-work and the frame 22. The wagon elevator 21 is held in inclined position by a rod 59 connected to a bale 60 connected in turn to upstanding projections 61 on the transverse member 49.

When the corn harvester 16 is close-coupled, as shown in Figure 1, it is driven from a power take-off shaft 62 extending from the rear of the tractor to a shaft 63 on the corn harvester 16. When the corn harvester is connected to the tractor in pull-behind relationship, as shown in Figure 4, the shaft 63 on the corn harvester 16 is driven from the power take-off of the tractor, not shown in this figure, through a long telescoping shaft 64.

It will be apparent from the foregoing description that a new and novel structure has been devised for connecting an implement, such as a corn picker, to a tractor in either close-coupled relationship or in pull-behind relationship. For close-coupling, the connecting structure comprises essentially an L-shaped frame, of which one leg extends transversely across the rear of the tractor and the other leg extends longitudinally along the side of the tractor and bends inwardly toward the tractor and is connected adjacent the front thereof. When the harvester is connected to the tractor in pull-behind relationship, the connecting structure is converted to a more extensive structure by means of a converting framework which includes a joining member attached to the forward bent end of the longitudinal leg of the L-shaped frame, a longitudinal member secured at one end to the joining member and, at the other end, to the transverse leg of the L-shaped frame, and a transverse member secured to and connecting the longitudinal member and the longitudinal leg of the L-shaped frame. By this structural arrangement a corn picker may be connected to a tractor either in close-coupled relation or in pull-behind relation, and the essential feature of novelty is the use of the frame parts by which the corn picker is close-coupled in the structure and by which the corn picker is connected in pull-behind relation. The legs of the L-shaped frame may be regarded as two sides of an imaginary quadrilateral which is made complete by the addition of the converting framework. The novel structural arrangement of the present invention is illustrated with a corn picker, but obviously it may be used as well with other types of harvesters and implements.

The intention is to limit the invention only within the scope of the appended claims.

What is claimed is:

1. The combination with a frame for carrying a harvester in close-coupled relationship to a tractor having a rear axle and a wheel at the end thereof, said frame being in the form of an L composed of a transverse leg and a longitudinal leg having a bent outer end extending at an obtuse angle to the remainder of the leg to the same side thereof as the transverse leg and having a supporting wheel adjacent the connection of the legs, the frame being adapted to extend out and around the tractor wheel with the bent end of the longitudinal frame leg connected adjacent the front of the tractor and the transverse frame leg connected to the tractor to the rear of the rear axle, of means for adapting the aforesaid frame for carrying the harvester in pull-behind relationship to the tractor, said means comprising a framework composed of a joining member adapted to be attached to the bent end of the longitudinal frame leg, a longitudinal member attached at one end to the joining member and extending at an acute angle therefrom and adapted to be attached at its other end to the transverse frame leg, a transverse member secured adjacent one end to a point of the longitudinal member near the end adapted to be connected to the transverse frame leg, and adapted to be attached at its other end to the longitudinal frame leg, and a supporting wheel connected adjacent the point of attachment of the transverse and longitudinal members.

2. The combination with a frame for close coupling to a tractor having a rear axle and a wheel at one end thereof, an implement extending along the tractor outside the tractor wheel, said frame having a supporting wheel and being in the form of an L composed of a longitudinal leg connected adjacent the front of the tractor and a transverse leg connected to the tractor to the rear of the rear axle of a converting framework for adapting the frame to connect the implement to the tractor in pull-behind relationship, said framework comprising a longitudinal member adapted to be attached at one end to the outer end of the transverse frame leg, means attached to the other end of the longitudinal member and adapted to be attached to the outer end of the longitudinal frame leg, a transverse member adapted to extend parallel to and adjacent but spaced from the transverse frame leg and attached at one end to the longitudinal member and adapted to be attached at the other end to the longitudinal frame leg, and a supporting wheel.

3. The combination with a frame for supporting, in close-coupled relationship to a tractor having a rear axle and a wheel at one end of the rear axle at one side of the tractor, a harvester extending along the said one side of the tractor outside the said tractor wheel, said frame comprising a supporting wheel, a transverse leg extending in spaced parallel relation to the rear axle from a point behind the tractor to a point outside the said tractor wheel, a longitudinal leg attached to the outer end of the transverse leg outside the said tractor wheel and having an end portion away from the transverse leg extending at an obtuse angle to the remainder of the leg and connected to a forward portion of the tractor, of a converting framework for adapting the frame to connect the harvester to the tractor in pull-behind relationship, said frame work comprising a longitudinal member adapted to be attached at one end to the end portion of the longitudinal frame leg and at the other end to the transverse frame leg and a transverse member extending parallel to the transverse frame leg and attached at one end to the longitudinal member and adapted to be attached at the other end to the longitudinal frame leg.

4. The combination with a frame for close-coupling an implement at the side of a tractor, said frame comprising a longitudinal portion extending alongside the tractor and a transverse portion extending along the rear of the tractor, of a converting framework for adapting the frame to connect the implement to the tractor in pull-behind relation, said framework comprising a longitudinal portion and a transverse portion attached to one another and adapted to be attached to the longitudinal and transverse portions of the frame.

5. The combination with a frame for close-coupling a harvester at the side of a tractor, said frame comprising a longitudinal portion extending alongside the tractor and a transverse portion extending along the rear of the tractor of a converting framework for adapting the frame to connect the harvester to the tractor in pull-behind relation, said framework comprising a longitudinal member adapted to extend in spaced parallel relation to the longitudinal portion of the frame, and means adapted to connect the ends of the longitudinal member to the transverse and longitudinal portions of the frame.

6. The combination with a frame for close-coupling an implement at the side of a tractor, said frame comprising a longitudinal portion extending alongside the tractor and a transverse portion extending along the rear of the tractor, of a converting framework for adapting the frame to connect the implement to the tractor in pull-behind relation, said framework comprising longitudinal and transverse portions adapted to be attached to the frame to form therewith a generally quadrilateral shape.

7. The combination with a frame forming two adjacent sides of an imaginary quadrilateral for connecting a harvester in close-coupled relation at the side of a tractor, of a converting framework for adapting the frame to connect the harvester to the tractor in pull-behind relation, said converting framework comprising means forming two adjacent sides adapted to complete with the aforementioned sides an imaginary quadrilateral.

8. The combination with a frame forming two adjacent sides of an imaginary quardilateral for connecting an implement in close-coupled relation at the side of a tractor, of a converting framework for adapting the frame to connect the implement to the tractor in pull-behind relation, said converting framework comprising means forming two adjacent sides adapted to complete the sides of the aforementioned imaginary quadrilateral, and a member adapted to extend in spaced parallel relation to the one side of the imaginary quadrilateral formed by the frame and to connect that one side and the side of the quadrilateral opposite that one side and formed by the converting framework.

9. The combination with a frame for close-coupling a harvester at the side of a tractor, said frame comprising transverse and longitudinal portions forming two adjacent sides of an imaginary quadrilateral, of a converting framework for adapting the frame to connect the harvester to the tractor in pull-behind relation, said framework comprising transverse and longitudinal portions adapted to be connected to the transverse and longitudinal portions of the frame to complete the imaginary quadrilateral.

BENJAMIN M. HYMAN.